Dec. 21, 1943. W. H. FRANKLAND 2,337,382
HEATING AND VENTILATING SYSTEM
Filed Sept. 3, 1940 2 Sheets-Sheet 1
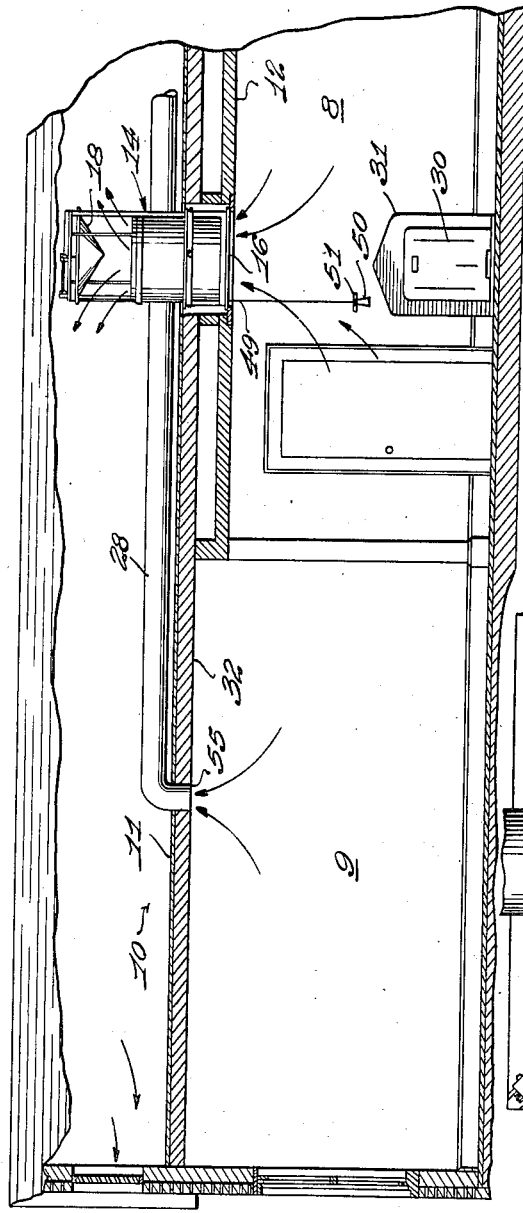
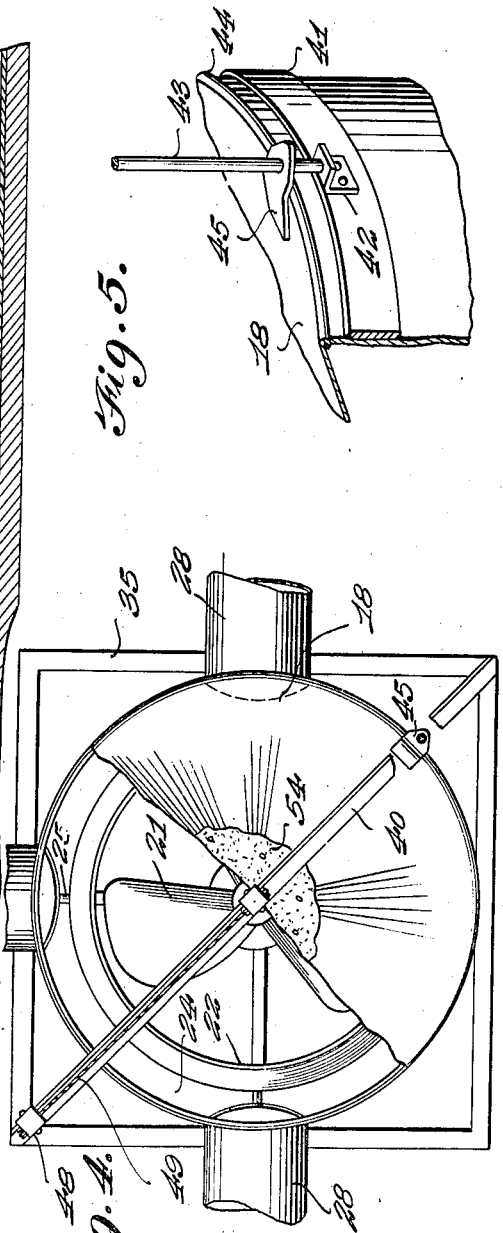

Dec. 21, 1943. W. H. FRANKLAND 2,337,382
HEATING AND VENTILATING SYSTEM
Filed Sept. 3, 1940 2 Sheets-Sheet 2

Inventor
W. H. Frankland
By Mason Fenwick & Lawrence
Attorneys

Patented Dec. 21, 1943

2,337,382

UNITED STATES PATENT OFFICE 2,337,382

HEATING AND VENTILATING SYSTEM

William Howard Frankland, Tampa, Fla.

Application September 3, 1940, Serial No. 355,240

5 Claims. (Cl. 98—33)

This application is a continuation in part of my co-pending application, Serial No. 347,567, filed July 25, 1940, the present application being directed to improvements over the structure of the earlier application.

An object of the present invention is to provide a simple and inexpensive construction to render a dwelling more uniformly comfortable throughout, by providing a more uniform ventilation of the house in summer and a more uniform heating of the house in the winter.

Pursuant to this object I provide an air distributing system arranged to draw air from one portion of the house, which may be a room or group of rooms receiving direct heat from a heating unit located therein, or one or more rooms which are better heated by the heating system of the dwelling. The air distributing system provides a main exhaust passage into the attic, and one or more auxiliary ducts, each communicating with a room of the dwelling which is heated or ventilated deficiently. The system can be adjusted for heating in the winter and for ventilating in the summer. When the system is adjusted for ventilating, the auxiliary ducts operate to draw off air from the respective rooms with which they communicate.

The invention contemplates a closure element for the main exhaust passage of the air distributing chamber, adjusted to close the passage for heating purposes and to open the passage for ventilating. The closure element is readily operable from the dwelling rooms below. The closure element is so constructed that, in open condition it spreads the air in all directions into the attic, and in closed position it directs the flow of air into the several auxiliary ducts.

The structure of the present invention provides a simpler and improved fan mounting, one advantage of which is that it provides a by-pass for air circulation which automatically regulates the rate of air flow in the auxiliary ducts in the respective conditions of operating the system for heating and ventilating.

These and other advantages will be obvious from a more detailed understanding of the invention to be derived from the preferred embodiment shown in the accompanying drawings. In the drawings Figure 1 shows the invention as applied to an attic equipped dwelling;

Figure 4 is a plan view of the air distributing chamber with parts broken away; and Figure 5 is a view showing a detail of the invention.

Figure 2:
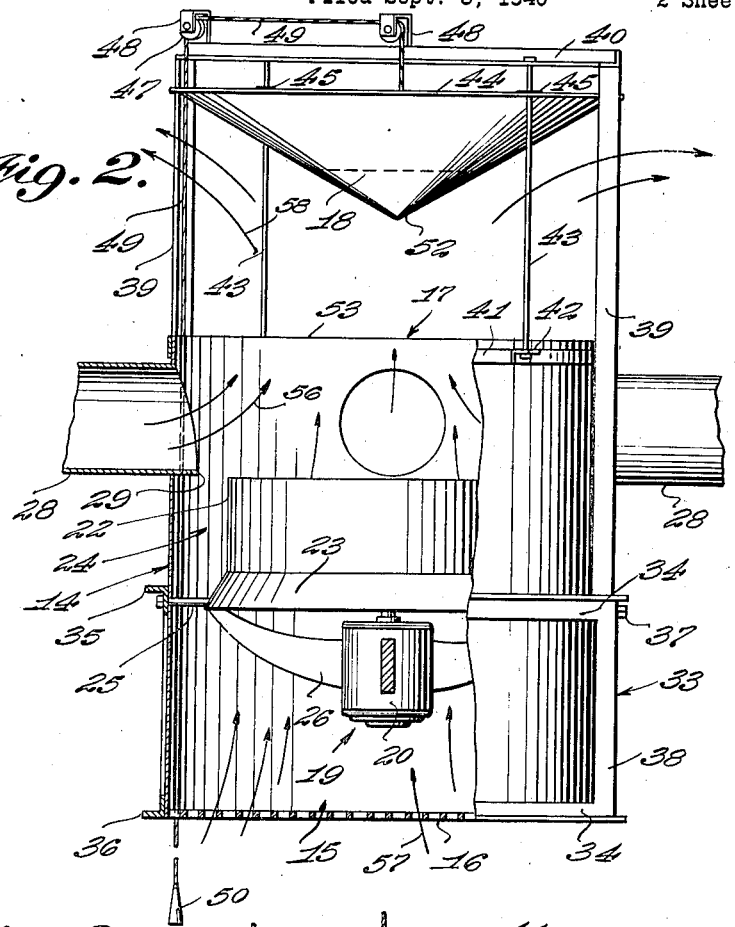
Figure 2 shows the air distributing chamber of the invention partly in cross sectional elevation, adjusted for ventilation.

The drawings show the device of the invention as applied to a dwelling which may be of any conventional construction, preferably of the small dwelling type. It comprises the respective dwelling rooms 8 and 9 below, Figure 1, and the attic 10 above. Mounted within the floor 11 of the attic 10, and extending upwardly from the surface 12 of the ceiling of the room below, is the air distribution chamber 14, communicating with the living room below through the inlet passage at 15. The inlet passage 15 is preferably flush with the ceiling and provided with a grill 16, Figures 2 and 3, of any suitable ornamental construction. The main exhaust passage 17 of the air distributing chamber 14 is at the top thereof and is adapted to be opened or closed at will by a closure element 18 movable up and down, to the positions of Figures 2 and 3, respectively.

In the preferred practice of the invention the air distribution chamber 14 comprises a cylinder which preferably projects above the floor 11 of the attic a distance determined by its necessary length, and by the distance between the floor 11 and the surface 12 of the ceiling. See Figure 1. According to a preferred practice of the invention, a power driven air moving device, indicated generally at 19, is mounted in the air distributing chamber 14 intermediate of its length between the inlet passage 15 and the main exhaust passage 17. In the embodiment shown it consists of an electrically driven exhaust fan, which may be of conventional construction.

The fan, as shown, comprises an electric motor 20 and the blades 21, which are mounted on the motor shaft. The blades 21 are surrounded by the flow directing duct 22 consisting of a cylinder flared at one end as shown at 23. The fan and its blades 21 are positioned in the flow directing duct 22, as shown, in a manner to direct the flow of air through the air distribution chamber 14 from the inlet passage 15 towards the exhaust passage 17. The motor 20 and duct 22 are connected together by ribs 26 to provide a composite fan unit 19. The fan unit 19 is of a size to fit within the cylinder of the air distribution chamber 14 with circumferential clearance to provide the passage 24 outside the duct 22 and within the cylinder of the air distribution chamber 14. The fan unit 19 is held positioned within the cylinder 14 by means of radially projecting spacer member 25 bolted or otherwise attached to the housing comprising the air distribution chamber 14.

Between the inlet passage 15 and the main exhaust passage 17, specifically beyond the fan unit 19 toward the main exhaust passage 17, one or more auxiliary ducts 28 communicate with the air distribution chamber 14 through the side walls thereof. See Figures 2 and 3. In the preferred practice of the invention each auxiliary duct projects through the wall of the cylinder of the chamber 14, and beyond the inside surface thereof on the approach side of the flowing air, to provide the apron 29. The apron 29 operates to induce air flow in the duct 28 more efficiently when the system is adjusted for ventilation, and operates to direct air into the duct 28 when the system is adjusted for heating.

To install the system, and in mounting the air distribution chamber 14 in the attic, a place is selected above a dwelling room 8 which is more efficiently heated than others. This may be the main dwelling room of the house. It may be an auxiliary hall or other passage in the dwelling, preferably centrally located, which communicates with the living rooms and which is heated. Accordingly, and as in the practice of the invention shown, the room 8 may be provided with the heater 30, set into a niche 31. The ceiling 12 of the room 8 may be dropped below the level 32 of ceilings in other rooms of the house. In the practice of locating the heater in a hall which communicates with dwelling rooms, the dropped ceiling is desirable for better warm air circulation independent of the device of the invention. In the practice of the invention it affords a greater depth between the attic floor 11 and the ceiling 12, and permits the air distribution chamber 14 to set lower with reference to the attic floor. Thus, in the practice of the invention shown, the auxiliary ducts 28 enter the air distributing chamber immediately above the attic floor.

For convenient installation of the device the air distribution chamber is mounted in a frame, indicated generally at 33, to provide a unitary structure. The frame 33 comprises horizontal beams 34 joined to form upper and lower squares 35 and 36 which enclose the cylinder of the air distributing chamber 14, and contact the walls thereof at the four tangential points of contact. The walls of the air distributing chamber 14 are attached to squares at the tangential contact points by bolts 37, or other suitable means, the bolts in the upper square 35 also acting as a firm attachment of the fan unit 19 to the more rigid structure of the frame 33. The squares 35 and 36 are attached to each other spaced apart by the corner pieces 38, the whole presenting a substantial rigid construction which facilitates shipping and installing the device. The beams 34 and corner pieces 38 may conveniently consist of angle irons or other light weight structural irons, connected at the corners of the squares 35 and 36 by welding or other suitable means.

At diagonally opposite corners of the squares are provided the upright beams 39 connected at their upper ends by the diagonal cross beam 40 to form a superstructure to support the closure element 18. A bracing band 41 near the upper edge of the air distribution chamber 14 adds rigidity to the cylinder thereof. At diametrically opposite points brackets 42 are attached to the band 41 and the guide rods 43 are attached at one of their ends each to a bracket 42. The opposite ends of the rods 43 are attached to the diagonal beam 40. Attached to diametrically opposite points of the rim 44 of the closure element 18 are the guide eyes 45, through which the rods 43 pass to guide the closure element 18 in its movement between its upper open position and lower closed position.

Sheaves 47 are rotatably mounted on the bearing brackets 48, fixed to the diagonal beam 40, and positioned respectively above the center of the closure element 18 and near one corner of the frame outside the limits of the air distributing chamber 14. A chain or similar strand 49 is attached at one end thereof to the top of the closure element 14, passing over the sheaves 47 and down through the ceiling 12 into the room 8, terminating with a handle 50. A clip 51, attached to the wall or other suitable support in the room 8 provides an anchor for the end of the strand 49.

Figure 3:
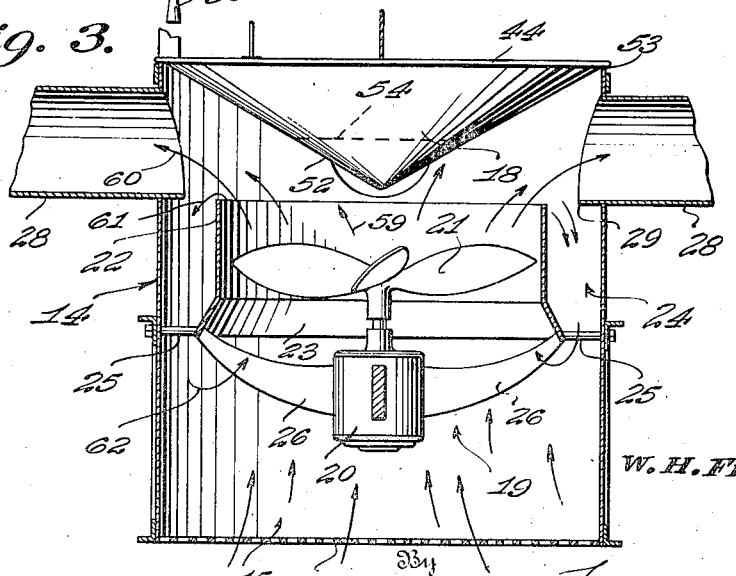
Figure 3 shows the air distributing chamber in cross sectional elevation, adjusted for heating.

As noted in Figures 2 and 3, the closure element 18 provides a conical surface 52, the apex of the cone being disposed downwardly. The closure element 18 also includes a rim 44 which is flanged as shown, and which rests on the rim 53 of the main exhaust passage 17, when the closure element is in closed position shown in Figure 3. The closure element 18 is generally of sufficient weight to seal itself naturally when in closed position, but a quantity of cement 54, or similar heavy substance, poured into the cone of the closure element will insure proper sealing.

Each auxiliary duct 28 communicates with some room of the dwelling, preferably a room which is not well heated or well ventilated, or lacks the proper degree of both heating and ventilating facilities. Each duct 28 communicates with its incident room 9, preferably through the ceiling 32 thereof, as at 55 in Figure 1. The passage 55 through the ceiling may be equipped with a grill or similar ornamental structure.

The device of the invention operates to heat a dwelling uniformly throughout its several rooms in the winter time, and to ventilate the dwelling uniformly throughout its several rooms in the summer time. During the summer season, when the structure of the invention is to be employed for ventilating purposes, the closure element 18 is lifted to open the main exhaust passage 17, this being done by pulling the handle 50 of the strand 49 down and attaching it to a holding clip 51 conveniently located for the purpose. With the air distributing chamber so arranged and the closure element in open position, as illustrated in Figure 2, the fan 19 operates to exhaust air from the chamber 8, through the inlet passage 15 and out of the main exhaust passage 17. The conical surface 52 of the closure element 18 operates to direct the flow of air in all directions in the attic. The flow of air from the inlet passage 15 to and through the main exhaust passage 17 induces a draft in the auxiliary ducts 28 which draws air away from the rooms 9.

As will be noted from the showing of Figure 1, the air is drawn from all rooms 8 and 9 through the ceiling, this being preferred ventilating practice. The air near the ceiling, above the windows and door jambs, is warmest and most difficult to circulate. When the apparatus is adjusted for heating, the hot air delivered to rooms 9 through the auxiliary ducts is delivered down from the ceiling, which induces an air circulation within the room which carries the warmer air of the ceiling towards the floor.

When the system is adjusted for ventilating, and the closure element 18 is in open position, as illustrated in Figure 2, the air passes from the auxiliary ducts 28 into the air distributing chamber 14 in the direction of the arrows 56. The air from the room 8 passes through the flow directing duct 22 in the direction of the arrow 57, and together with the air from ducts 28 passes out of the chamber 14 through the exhaust passage 17 directed by the conical surfaces 52 in all radial directions as indicated by the arrows 58. When the system is adjusted for heating, with the closure element 18 in closed position illustrated in Figure 3, the hot air from the room 8 passes through the duct 22, in the direction of the arrows 59. The hot air is deflected in all directions radially by the conical surface 52, some of it passing into the ducts 28 in the direction of the arrows 60. Other portions of the hot air, especially that disposed circumferentially between ducts 28, will by-pass outside the duct 22 in the direction of the arrows 61 through the passage 24, to be again drawn through the duct 22 in the direction of the arrows 62, by the action of the fan blades 21. The passage 24 is made of a size to afford the desired force of hot air flow in the ducts 28.

It will be understood that the dimensions of the several parts may be varied to satisfy the requirements of various installations. The size and power of the fan unit 19, for example, may be varied according to requirements. The length of the duct 22, and the position of the fan unit 19 in the air distributing chamber 14 may be modified to meet particular requirements. The apparatus is susceptible of a number of modifications within the scope of the invention, which therefore is not limited by the specific structure disclosed in the specification and drawings. The scope of the invention is determined by the accompanying claims.

What I claim is:

1. Heating and ventilating system for attic equipped dwellings comprising an upright casing extending from the ceiling of the dwelling room below projecting upwardly through the floor of the attic having an inlet opening at its bottom and an exhaust opening at its top, the bottom opening being adapted to communicate with a room through the ceiling, a power driven fan mounted in said casing below the upper end rotatable on a vertical axis, a shell within said casing open at its lower and upper ends and surrounding said fan, spaced from said casing to provide an air passage through said fan and between said shell and casing, said shell having its upper end terminating below the upper end of said casing, ducts opening into said casing through the side walls thereof in close proximity to the plane of the upper end of said shell, and a damper for controlling the exhaust opening of said casing whereby when said damper is closed air is forced through said ducts while when said damper is open the fan blast discharging through said exhaust opening entrains air from said ducts.

2. A heating and ventilating system for attic equipped dwellings comprising, an air distributing chamber comprising a hollow cylinder extending from the ceiling of the dwelling room below projecting upwardly through the floor of the attic, an inlet passage at the lower end of the cylinder communicating into the dwelling room, a main exhaust passage at the upper end of the cylinder, a power driven fan within the cylinder between the inlet and main exhaust passage, a duct positioned within the cylinder and housing the fan, and auxiliary ducts entering the cylinder through the side walls thereof between the fan and the main exhaust passage, each auxiliary duct extending to and communicating with a predetermined room of the dwelling, a closure element for the main exhaust passage movable to rest on the upper end of the cylinder and to close the main exhaust passage without closing said duct, whereby when said closure element is closed air will be supplied to the rooms through the auxiliary ducts and when said closure element is open air will be removed from the rooms through the auxiliary ducts, and actuating means to lift the closure element away from or to lower the closure element into closing engagement with the main exhaust passage.

3. A heating and ventilating system for attic equipped dwellings comprising, an air distributing chamber, the chamber comprising a hollow cylinder extending from the ceiling of the dwelling room below projecting upwardly through the floor of the attic, an inlet passage at the lower end of the cylinder communicating into the dwelling room, a main exhaust passage at the upper end of the cylinder, a power driven fan within the cylinder between the inlet and main exhaust passage, and auxiliary ducts entering the cylinder through the side walls thereof between the fan and the main exhaust passage, each auxiliary duct extending to and communicating with a predetermined room of the dwelling, a cylindrical duct housing the fan within the air distributing chamber, the fan duct being positioned coaxial with the cylinder of the chamber, a closure element for the main exhaust passage movable to rest on the upper end of the cylinder and to close the main exhaust passage without closing said duct, whereby when said closure element is closed air will be supplied to the rooms through the auxiliary ducts and when said closure element is open air will be removed from the rooms through the auxiliary ducts, and actuating means to lift the closure element away from or to lower the closure element into closing engagement with the main exhaust passage.

4. A heating and ventilating system for attic equipped dwellings comprising, an air distributing chamber, the chamber comprising a hollow cylinder extending from the ceiling of the dwelling room below projecting upwardly through the floor of the attic, an inlet passage at the lower end of the cylinder communicating into the dwelling room, a main exhaust passage at the upper end of the cylinder, a power driven fan within the cylinder between the inlet and main exhaust passage, auxiliary ducts entering the cylinder through the side walls thereof between the fan and the main exhaust passage, each auxiliary duct extending to and communicating with a predetermined room of the dwelling, a cylindrical duct housing the fan within the air distributing chamber, the fan duct being positioned coaxial with the cylinder of the chamber, the fan duct cylinder being of smaller diameter than the cylinder of the distributing chamber, and being located concentrically therein to provide a by-pass between the two cylinders, a closure element for the main exhaust passage movable to close or open the main exhaust outlet at the upper end of the cylinder without closing said duct, whereby when said closure element is closed air will be supplied to the rooms through the auxiliary ducts and when said closure element is open air will be removed from the rooms through the auxiliary ducts, and means for actuating the closure element.

5. An air distribution unit for heating and ventilating a dwelling having a plurality of rooms, said unit comprising a hollow upright cylinder mounted between upper and lower rooms of the dwelling and having an air inlet at its lower end communicating with the lower room and a main exhaust outlet at its upper end communicating with the upper room, said cylinder also being provided with a main duct arranged concentrically within the cylinder below the main exhaust outlet and with a series of auxiliary ducts communicating with the cylinder between the main exhaust outlet and the outlet end of the main duct, said auxiliary ducts being adapted to connect the cylinder with a plurality of other rooms of the dwelling, a fan disposed within the main exhaust duct and operating to draw air through the air inlet of the cylinder and discharge it through the main exhaust outlet, and a closure member for controlling said main exhaust outlet and adapted to be moved to a position to close the same without closing the main air duct.

WILLIAM HOWARD FRANKLAND.